United States Patent
Bostick et al.

(10) Patent No.: US 10,386,793 B2
(45) Date of Patent: *Aug. 20, 2019

(54) OPTIMIZING OPERATIONS OF AN ELECTRONIC SYSTEM BASED ON THE QUALITY OF USER DEVICE INPUTS

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/819,438

(22) Filed: Nov. 21, 2017

(65) Prior Publication Data
US 2018/0088542 A1 Mar. 29, 2018

Related U.S. Application Data

(63) Continuation of application No. 14/825,398, filed on Aug. 13, 2015, now Pat. No. 9,864,348.

(51) Int. Cl.
G05B 13/02 (2006.01)
(52) U.S. Cl.
CPC .................. G05B 13/024 (2013.01)
(58) Field of Classification Search
CPC .................................................. G05B 13/024
See application file for complete search history.

(56) References Cited

U.S. PATENT DOCUMENTS

| 6,394,904 | B1 | 5/2002 | Stalker |
| 6,612,928 | B1 | 9/2003 | Bradford et al. |
| 8,016,680 | B1 | 9/2011 | Hutter et al. |
| 9,864,348 | B2 * | 1/2018 | Bostick ............... G05B 13/024 |

(Continued)

FOREIGN PATENT DOCUMENTS

WO 2009020869 A1 2/2009

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Vincent H Tran
(74) *Attorney, Agent, or Firm* — Law Office of Jim Boice (57) ABSTRACT

A processor-implemented method, system, and/or computer program product optimizes operations of an electronic system. The electronic system receives first operational inputs from a first user device. The electronic system also receives second operational inputs from a second user device. Operational input qualities of the first operational inputs and the second operational inputs are compared according to how efficiently the electronic system functions in response to the particular operational input being utilized by the electronic system. In response to determining that the operational input quality of the second operational inputs is equal to or greater than the operational input quality of the first operational inputs, only the second operational inputs from the second user device are utilized to control the electronic system.

20 Claims, 5 Drawing Sheets

(56) References Cited

U.S. PATENT DOCUMENTS

| | | |
|---|---|---|
| 2003/0130031 A1 | 7/2003 | Yoshida et al. |
| 2003/0185358 A1 | 10/2003 | Sakamoto |
| 2010/0192063 A1 | 7/2010 | Saoumi |
| 2014/0167935 A1* | 6/2014 | Eden ............... H04N 21/42204 340/12.54 |
| 2014/0274242 A1 | 9/2014 | Haswell |
| 2014/0295952 A1 | 10/2014 | Aoki et al. |
| 2017/0039359 A1* | 2/2017 | Yang ...................... G06F 21/32 |

OTHER PUBLICATIONS

M. Lavin, "Matchmaking on Xbox One with Smart Match", news.xbox.com, Jul. 30, 2013, pp. 1-4.
List of IBM Patents or Patent Application Treated as Related, Nov. 21, 2017.

* cited by examiner

OPTIMIZING OPERATIONS OF AN ELECTRONIC SYSTEM BASED ON THE QUALITY OF USER DEVICE INPUTS

BACKGROUND

The present disclosure relates to the field of electronic systems, and specifically to the field of electronic systems that are controlled by user inputs. Still more specifically, the present disclosure relates to the field of optimizing operations of electronic systems by utilizing optimal user device inputs.

SUMMARY

A processor-implemented method, system, and/or computer program product optimizes operations of an electronic system. The electronic system receives first operational inputs from a first user device. The electronic system also receives second operational inputs from a second user device. Operational input qualities of the first operational inputs and the second operational inputs are compared according to how efficiently the electronic system functions in response to the particular operational input being utilized by the electronic system. In response to determining that the operational input quality of the second operational inputs is equal to or greater than the operational input quality of the first operational inputs, only the second operational inputs from the second user device are utilized to control the electronic system.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
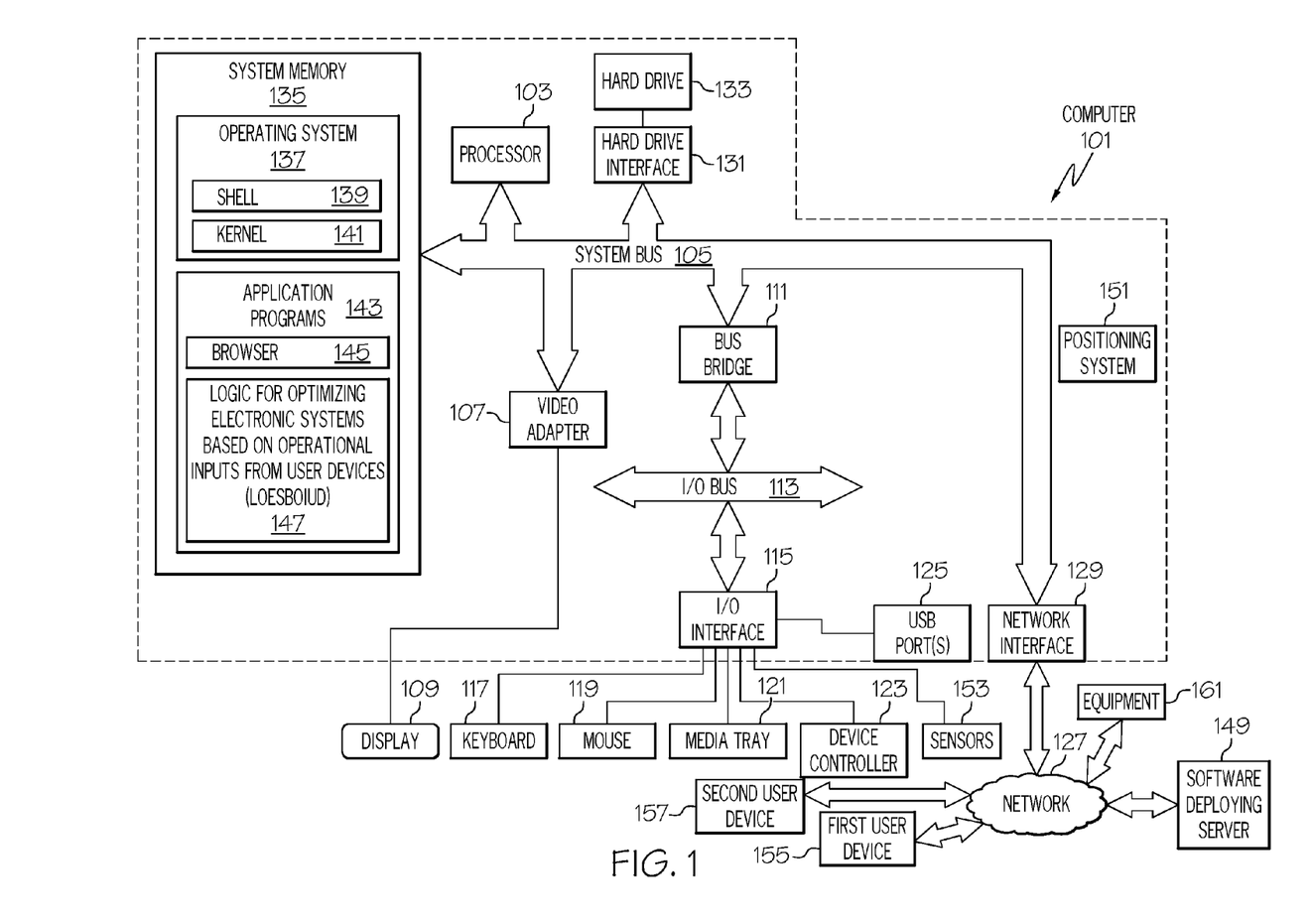
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or first user device 155 and/or second user device 157 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a device controller 123 (i.e., an input device such as a joystick, a wireless controller that captures movement of a user to generate inputs to a video game, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., first user device 155 and/or second user device 157, etc.) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Optimizing Electronic Systems Based on Operational Inputs from User Devices (LOESBOIUD) 147. LOESBOIUD 147 includes code for implementing the processes described below, including those described in FIG. 2. In one embodiment, computer 101 is able to download LOESBOIUD 147 from software deploying server 149, including in an on-demand basis, wherein the code in LOESBOIUD 147 is not downloaded until needed for execution. In one embodiment of the present invention, software deploying server 149 performs all of the functions associated with the present invention (including execution of LOESBOIUD 147), thus freeing computer 101 from having to use its own internal computing resources to execute LOESBOIUD 147.

Also within computer 101 is a positioning system 151, which determines a real-time currently location of computer 101 (particularly when part of an emergency vehicle and/or a self-driving vehicle as described herein). Positioning system 151 may be a combination of accelerometers, speedometers, etc., or it may be a global positioning system (GPS) that utilizes space-based satellites to provide triangulated signals used to determine two or three dimensional locations.

Also associated with computer 101 are sensors 153, which detect an environment of the computer 101. More specifically, sensors 153 are able to detect physical environments as well as biometric details of a user.

For example, sensors 153 may be microphones for detecting a noise level, light sensors for detecting a light level, chemical sensors for detecting ambient chemicals or other airborne substances, etc. in the proximity of the computer 101.

Alternatively, sensors 153 may be biometric sensors that collect biometric information about a user of the computer 101. Examples of such biometric information include, but are not limited to, skin temperature, pupil dilation, respiratory rate, blood pressure, etc. Such readings may be taken remotely (e.g., using a camera that captures pupil size), from worn sensors (e.g., a blood pressure cuff), or invasively (e.g., a swallowed thermometer pill that can be remotely interrogated).

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
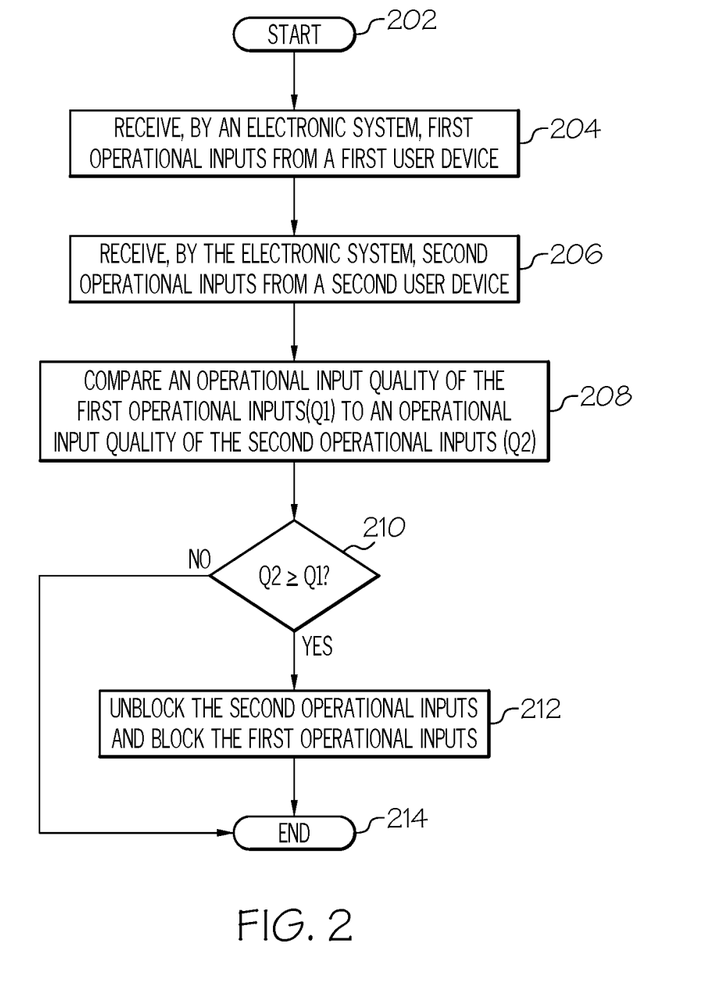
FIG. 2 is a high-level flow chart of one or more steps performed by one or more electronic devices and/or processors to optimize operations of an electronic system in accordance with one or more embodiments of the present invention.

With reference now to FIG. 2, a high-level flow chart of one or more steps performed by one or more electronic devices and/or processors to optimize operations of an electronic system in accordance with one or more embodiments of the present invention.

After initiator block 202, an electronic system receives first operational inputs from a first user device, as described in block 204. These first operational inputs control operations of the electronic system.

In one embodiment, the electronic system, using some or all of the architecture of the computer 101 shown in FIG. 1, is a server that is being used by an enterprise. Operational inputs from users control usage of various resources within the electronic system/server/computer 101, as described in further detail below.

In another embodiment, the electronic system, using some or all of the architecture of the computer 101 shown in FIG. 1, is a game server that supports online multi-player usage. Operational inputs from users/players control how efficiently the game progresses, as described in further detail below.

In another embodiment, the electronic system, using some or all of the architecture of the computer 101 shown in FIG. 1, controls operations of equipment, such as equipment 161 shown in FIG. 1. Operational inputs from operators control how efficiently the equipment 161 operates, as described in further detail below.

Returning to FIG. 2 and as described in block 206, the electronic system receives second operational inputs from a second user device. However, the second operational inputs are overridden by the first operational inputs at the electronic system That is, by overriding the second operational inputs blocks with the first operational inputs, then the second operational inputs initially do not control operations of the electronic system. Thus, the electronic system receives both the first operational inputs and the second operational inputs, but only uses the first operational inputs, while ignoring/blocking the second operational inputs.

For example, assume that two users, respectively using the first user device 155 and the second user device 157 shown in FIG. 1, are attempting to control the operations of a server. Thus, in FIG. 1 a first user of first user device 155 is inputting inputs that are transmitted to the electronic system (computer 101). Similarly (and in one embodiment at the same time as the first user), a second user of the second user device 157 is inputting inputs that are transmitted to the electronic system (computer 101). However, the electronic system (computer 101) initially only processes the inputs from the first user (i.e., uses the first inputs to control the operations for which the computer 101 is designed to handle, such as processing payroll, serving webpages, etc.). The inputs from the second user are not executed, but rather are simply stored for further/future evaluation.

Thus as shown in block 208 of FIG. 2, one or more processors (e.g., processor 103 shown in computer 101 in FIG. 1) compare an operational input quality of the first operational inputs to an operational input quality of the second operational inputs. As used herein, an operational input quality of a particular operational input is defined as a value that describes how efficiently the electronic system functions in response to the particular operational input being utilized by the electronic system.

Thus, in the present invention, assume for explanatory purposes that the first operational input and the second operational input are both designed to access data from a local storage device (e.g., hard drive 133 shown in FIG. 1). The first operational input, which is actually executed, is code that includes instructions A,B,C to access the data. The second operational input, which is not executed, is code that includes instructions D,E,F to access the data. In order to determine which set of instructions is more efficient in accessing the data (i.e., takes fewer clock cycles of the processor 103, ties up fewer execution units (e.g., a floating point execution unit within a core of processor 103), takes up less of the bandwidth of the system bus 105, etc.), two approaches can be taken.

In a first approach, a lookup table of past executions of instructions A,B,C and D,E,F to access data from hard drive 133 is examined. That is, assume that computer 101 has a history of executing instructions A,B,C and instructions D,E,F to access data from hard drive 133, and that a record has been kept of how many clock cycles were used by the processor 103, how much bandwidth was tied up in system bus 105, etc. when executing the instructions A,B,C as compared to executing instructions D,E,F. The set of instructions that uses fewer clock cycles and takes up less bandwidth is deemed to be more efficient.

In a second approach, a virtual machine (VM) that models computer 101 is used. That is, a VM of computer 101 is generated by computer 101 or, preferably, by another computer system. The physical computer 101 then executes instructions A,B,C while the VM executes instructions D,E, F. Whichever machine (physical computer 101 or the VM) operates more efficiently (physically or virtually, depending on the machine) determines which user inputs (instructions A,B,C from the first user or instructions D,E,F from the second user) are more efficient.

Returning now to FIG. 2, a query is made as to whether or not the operational input quality of the second operational inputs (Q2) is equal to or greater than the operational input quality of the first operational inputs (Q1). That is, is Q2≥Q1? If so, then one or more processors unblock the second operational inputs and block the first operational inputs (block 212). Thus, the unblocked second operational inputs now control operation of the electronic system, and while the blocked first operational inputs no longer control operation of the electronic system.

The process ends at terminator block 214.

In an alternative embodiment of the present invention an assumption is made that the first operational inputs result in optimal efficiency of the electronic system. In this alternative embodiment, if the second operational inputs emulate the first operational inputs (e.g., by providing the same response to certain conditions presented by the electronic system that the first operational inputs provide), then an assumption is made that the second user device will operate the electronic system as efficiently as the first user device, such that control of the electronic system can be safely turned over to the second user device from the first user device.

In order to understand how the present invention improves the operation of a system in one embodiment, consider again the embodiment introduced above, in which the electronic system is a server that is being used by an enterprise, and operational inputs from users control usage of various resources within the server. As described above, the operational inputs may be computer code used to access data from a storage device. In another embodiment, however, assume that the server is a webpage server, and the operational inputs are search keywords used to locate a particular webpage. Thus, a first user may be very knowledgeable about the subject of "Topic A", and enters only search keywords into a search engine that pulls up information related to Topic A. However, a second user knows little about Topic A, and thus does not know what questions to ask (i.e., does not know what keywords to input into a search engine). The enterprise that supports the server and the search engine running on that server may not want computing bandwidth of the server taken up by a novice "stumbling around" with the search engine, and thus will prevent the novice from using the search engine/server until he/she is more proficient. This proficiency level is determined by the number of webpages that the novice must go to until he/she finds what he/she is looking for. For example, an expert (who is using the first user device 155 shown in FIG. 1) on Topic A may only go to one or two webpages until he/she finds the information that he/she is looking for, while the novice (who is using the second user device 157 shown in FIG. 1) to Topic A may go to 30-40 webpages until he/she stumbles upon the same information found by the expert going to 1-2 webpages. Only when the novice is able to demonstrate the same level of efficiency in searches (e.g., on a "training machine", such as a VM supported by another system) will the webpage server allow the novice to use its resources, thereby turning operational control over to the second user device 157 shown in FIG. 1.

Consider now the embodiment introduced above in which the electronic system is a game server that supports online multi-player usage, and operational inputs from users/players control how efficiently the game progresses. Assume that operational inputs come from a game controller (e.g., including joysticks, directional pads, programmable buttons, motion detectors, etc.), which is a component of the first user device 155 and the second user device 157 shown in FIG. 1. Assume further that a first player is highly proficient in playing a game and in using the game controller, while a second player is not proficient in playing the game and in using the game controller. Assume further that the second player is able to watch the first player as he/she uses his/her game controller, and that the first player and the second player are playing the same video game at the same time. Any particular move made by one player will override a move of another player if that particular move results in the resources of the game server being used more efficiently.

For example, assume that the first player (a primary player of a video game) pushes button A on his/her game controller in response to event X in the video game, while the second player pushes button B on her/her game controller in response to that same event X in the video game. If pushing button A results in the game server using fewer resources (e.g., fewer instructions from a video driver) to move the video game along that pushing button B, then the input by the first player (pushing button A) is deemed to be more efficient than the input by the second player (pushing button B). The number of instructions from the video driver required to respond to button A or button B are stored in a lookup table. Alternatively, an input from pushing button A is applied to a first VM that emulates the game server while an input from pushing button B is applied to a second VM that also emulates the game server, such that the VM that operates more efficiently determines while operational input (pushing button A or pushing button B) is of a higher quality/efficiency.

Thus, the input from the first player (pushing button A) is accepted by the game server, while the input from the second player (pushing button B) is rejected by the game server. However, as the second player becomes more efficient at playing this video game, his/her inputs will become as good as or better than those of the first player. When this occurs for more than a predetermined number of inputs (or for more than a predetermined amount of time), then the second player becomes the primary player, and the first player can leave the game.

Consider now the embodiment introduced above in which the electronic system controls operations of equipment, and operational inputs from operators control the equipment 161 shown in FIG. 1. Assume that a first operator (e.g., an experience person who has the responsibility of operating equipment 161) inputs first operational inputs to computer 101 that control equipment 161 in response to events displayed on a display on the first user device 155 (e.g., display 109 shown in FIG. 1). For example, assume that equipment 161 is a set of pumps in a refinery, that the pumps are controlled by a master system (computer 101), and that operation of the pumps is controlled using a touch screen input device (display 109 in FIG. 1) in the first user device 155. Assume further that a second operator (e.g., a novice operator who is in training) inputs second operational inputs from the second user device 157 in response the same events that are being displayed on the display on the first user device 155. The computer 101 compares the operational inputs from the first operator and the second operator. Only if the inputs from the second operator meet or exceed the quality of the inputs from the first operator will the second operator allowed to become the primary operator of the equipment 161, such that the operation of the equipment 161 (as well as the entire refinery) is improved.

In an embodiment of the present invention, assume that the first operational inputs are generated at a first user device 155 shown in FIG. 1, that the second operational inputs are generated at the second user device 157 shown in FIG. 1, wherein that control of operation of the electronic system (e.g., computer 101, which may control equipment 161, etc.) has reverted to the first user due to a decrease in operational input quality of the second operational inputs. That is, the first user has regained primary control of the electronic system since the quality of the second operational inputs by the second user has declined. In this embodiment, a message is transmitted to the second user device describing a deficiency in the second operational inputs from the second user, such that the deficiency in the second operational inputs causes the operational input quality of the second operational inputs to be lower than the operational input quality of the first operational inputs.

For example, assume that the second user of the second user device 157 earlier took over control of computer 101 in FIG. 1 from the first user of the first user device 155. However, the first user still shadows the second user by inputting his/her own inputs. After some period of time, the quality of the second user's inputs have reverted to being lower than those of the first user, and thus the first user again takes over primary control of the electronic system (e.g., computer 101). However, the second user will still input operational inputs at the second user device 157, which will not be executed by the computer 101 for reasons stated above. The reason why the second user's inputs are not used (e.g., the second user's inputs request a memory device that is no longer part of computer 101, thus bogging down the computer 101 while it looks for this nonexistent device; the second user's inputs do not include the proper security code or authentication code required to control the computer 101, thus bogging down the computer 101 while it responds to this invalid request; the second user's inputs request data from a slow storage device (e.g., hard drive 133) instead of a faster storage device (e.g., system memory 135), thereby degrading the operation of the computer 101, etc.) are then sent to the second user (e.g., to his second user device 157), allowing him/her to alter how he/she provides operational inputs to the computer 101.

In one embodiment of the present invention, an identifier is passed on from a first user to a second user once the second user is deemed to be inputting operational inputs that are of a sufficiently high quality. That is, assume that the first operational inputs described above are generated at a first user device by a first user, and that the second operational inputs described above are generated at a second user device by a second user. One or more processors (e.g., processor 103 shown in FIG. 1 as being within computer 101), assign a first identifier to the first user of the first user device. For example, the first user of the first user device 155 may be given the identity "Primary user". Thereafter, in response to unblocking the second operational inputs and blocking the first operational inputs (described above as occurring when the quality of the second operational inputs meets or exceeds the quality of the first operational inputs), one or more processors assign the first identifier to the second user of the second user device. For example, the second user of the second user device 157, who previously may been known as "Novice user" becomes known as "Primary user" once the quality of the second user's operational inputs meet or exceed those of the primary first user. Thus, not only is the authority/ability to be the primary (first) user of the electronic system passed from the first user to the second user, but the identity of the primary user is also passed from the first user to the second user.

In one embodiment of the present invention, the second user device is able to compare and contrast operational inputs that it produces to those of the first user device. That is, assume again that the first operational inputs described above are generated at a first user device 155 shown in FIG. 1, and that the second operational inputs are generated at a second user device 157 shown in FIG. 1. One or more processors, within the first user device 155 and/or the computer 101 shown in FIG. 1, then transmit, to the second user device, a message comparing and contrasting the first operational inputs and the second operational inputs. This allows the second device determine the quality of the second operational inputs to the quality of the first operational inputs, as described above.

In one embodiment of the present invention, transfer of control over the electronic system is determined by a second user and/or second user device excelling in controlling part, but not all, of the electronic system. That is, assume that the first user (and thus the first user device 155 shown in FIG. 1) described above initially has total control over the electronic system. The electronic system receives third operational inputs from the first user/device (which control a portion of the operations of the electronic system) and fourth operational inputs from the second user/device (which control, or at least attempt to control, the same portion of the operations that are controlled by the third operational inputs). The operational input quality (defined and/or described above as a value of measuring how efficient the electronic system operates using particular operational inputs) of the third operational inputs is compared to the operational input quality of the fourth operational inputs. In response to determining that the operational input quality of the fourth operational inputs is greater than the operational input quality of the third operational inputs, one or more processors (e.g., processor 103 in computer 101 in FIG. 1) transfer the total control of the electronic system from the first user device to the second user device.

For example, if the second user inputs operational inputs at the second user device that make a significant mission-critical portion of computer 101 operate more efficiently (e.g., makes the processor 103 in FIG. 3 operate faster), then a decision may be made by computer 101 to turn over total control of itself from the first user device 155 to the second user device 157, regardless of how well the second user device 157 (and/or its second user) are controlling the hard drive 133, the I/O interface 115, the network interface 129, etc.

In one embodiment of the present invention, once operational control is passed from one user device to another user device, authorization parameters are likewise transferred. That is, assume that one or more processors have assigned a set of authorization parameters to the first user device. This set of authorization parameters describes which resources of the electronic system (e.g., certain programs from the application programs 143 shown in FIG. 1, certain hardware within computer 101 such as the processor 103, the hard drive 133, etc.) are authorized to be accessed by the first user device 155. Assume further that total control over the electronic system has been transferred from the first user device 155 to the second user device 157. In response to this transfer of total control of the electronic system from the first user device to the second user device, one or more processors assign the set of authorization parameters to the second user device, such that the second user device 157 is now able to access the resources of the electronic system that previously were authorized to the first user device 155.

In one embodiment of the present invention, total control over the electronic system occurs only when a certain operation from a sequence of operations occurs. For example, a program running on computer 101 may have a place where it pauses, retrieves code/data from another location, asks for input from a user, etc.

Similarly, a video game may be a racing game that covers 100 virtual "laps" that the cars run on. In the example of a video game, the certain operation may be the completion of 25 of these virtual laps.

Thus, control of the electronic system is allowed to pass only when a certain place in the program or game occurs.

Therefore, in an embodiment of the present invention in which the electronic system performs a set of sequential operations, the electronic system transfers total control of the electronic system form the first user device to the second user device only in response to a predetermined operation from the set of sequential operations being reached by the electronic system.

In one embodiment of the present invention, transfer of control of an electronic system is only permitted if the first user device and the second user device are in the same place, thus preventing control of the electronic system from being "hijacked" by a remote and nefarious user/system. Thus, one or more processors (e.g., processor 103 in computer 101 in FIG. 1) receive a first positioning signal from a first positioning system (e.g., positioning system 151 shown in FIG. 1) on the first user device 155, where the first positioning signal identifies a current location of the first user device. The processors also receive a second positioning signal from a second positioning system on the second user device, where the second positioning signal identifies a current location of the second user device. Processors then compare the first positioning signal to the second positioning signal. If the first positioning signal and the second positioning signal are equal (e.g., represent the same geophysical coordinates), then this indicates that the first user device and the second user device are in a same geophysical location, and a transfer of control from the first user device to the second user device is allowed to occur. However, if the first positioning signal and the second positioning signal are not equal, then the electronic system delays the transfer of control of the electronic system from the first user device to the second user device until the first positioning signal and the second positioning signal are equal. Similarly, if the first user device and/or the second user device do not generate positioning signals (e.g., due to not having a positioning system 151 and/or due to not activating the positioning system 151 shown in FIG. 1), an assumption is made that the first user device 155 and the second user device 157 are not in a same geophysical location.

In one embodiment of the present invention, transfer of control of the electronic system is prevented until certain environmental conditions surrounding the first user device and the second user device are the same. These environmental conditions may be inanimate (e.g., temperature, chemical presence, sound, etc.), or they may be related to an animate living object (e.g., users of the first user device and the second user device).

Thus, in this embodiment of the present invention, one or more processors (e.g., processor 103 in computer 101 shown in FIG. 1) receive a first sensor reading from a first sensor (e.g., from sensors 153 in FIG. 1) on the first user device 155. This first sensor identifies a first physical property of a first environment of the first user device. The processor(s) also receive a second sensor reading from a second sensor on the second user device 157. This second sensor identifies a second physical property of a second environment of the second user device. The processor(s) then compare the first sensor reading to the second sensor reading. If the first sensor reading and the second sensor reading are equal, this indicates that the first environment of the first user device and the second environment of the second user device are equal. If the first environment and second environment are the same, then transfer of control of the electronic system (e.g., computer 101) is allowed to proceed. However, in response to determining that the first sensor reading and the second sensor reading are not equal, then the electronic system delays the transfer of control of the electronic system from the first user device to the second user device until the first sensor reading and the second sensor reading are equal.

In one embodiment, the sensor readings are of the users of the first and second user devices used to control the electronic system. For example, assume that the first sensor reading is a first biometric reading of a first user of the first user device, and the second sensor reading is a second biometric reading of a second user of the second user device. Thus, transfer of control over computer 101 in FIG. 1 from the first user device 155 to the second user device 157 is allowed to occur only if the first user and the second user show the same biometric readings (e.g., have a same regular breathing pattern indicating a calm demeanor; have a same heart rate that indicates that they are both alive and healthy; have a same pupil dilation size indicating the same emotional state; etc.).

In another embodiment of the present invention, the sensor readings are of airborne substances. For example, assume that the first user device 155 is in a first location (e.g., one room in a building) while the second user device 157 is at second location (e.g., another room in the building). Assume further that the electronic system is a fire control system, and that smoke (an airborne substance) is filling the first location (as detected by the sensors 153 on the first user device 155). The first user of the first user device 155 will have initiated operations of the fire control system upon smelling the smoke, and perhaps has left the first location. However, there is initially no smoke in the second location. If control were allowed to immediately pass to the second user device 157, then the second user may be tempted to think that the first control system was activated by accident and may turn it off. However, by preventing the second user device 157 from taking control of the first control system until the second user is also exposed to the smoke (as detected by sensors 153 on the second user device 157), then this problem is overcome.

In another embodiment of the present invention, the sensor readings are of temperature readings. Again, assume that the first user device 155 (i.e., a first thermostat) is in a first location (e.g., one room in a building) while the second user device 157 (i.e., a second thermostat) is at second location (e.g., another room in the building). Assume further that the electronic system is a heating, ventilation, and air conditioning (HVAC) system controller, and that the first user device 155 is able to control the HVAC for all of the building, since airflow is consistent between the first location and the rest of the building. However, the second location is in a room that does not respond to temperature changes in the rest of the building as well as the first location. Thus, only if the second room (second location) reaches the same temperature as that found in the first room (first location) will control of the HVAC system controller be allowed to transfer from the first user device 155 (the first thermostat) to the second user device 157 (the second thermostat).

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
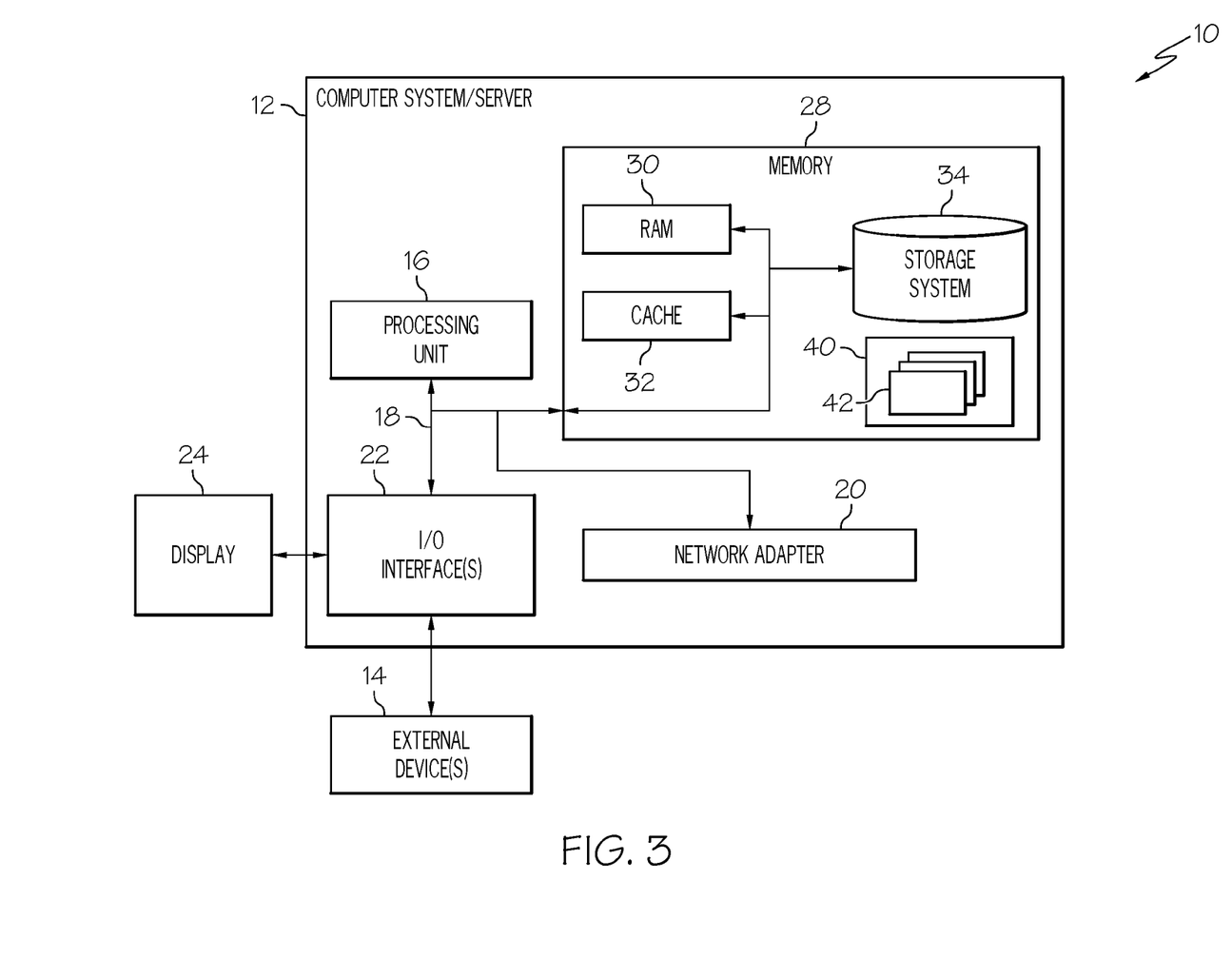
FIG. 3 depicts a cloud computing node according to an embodiment of the present disclosure.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
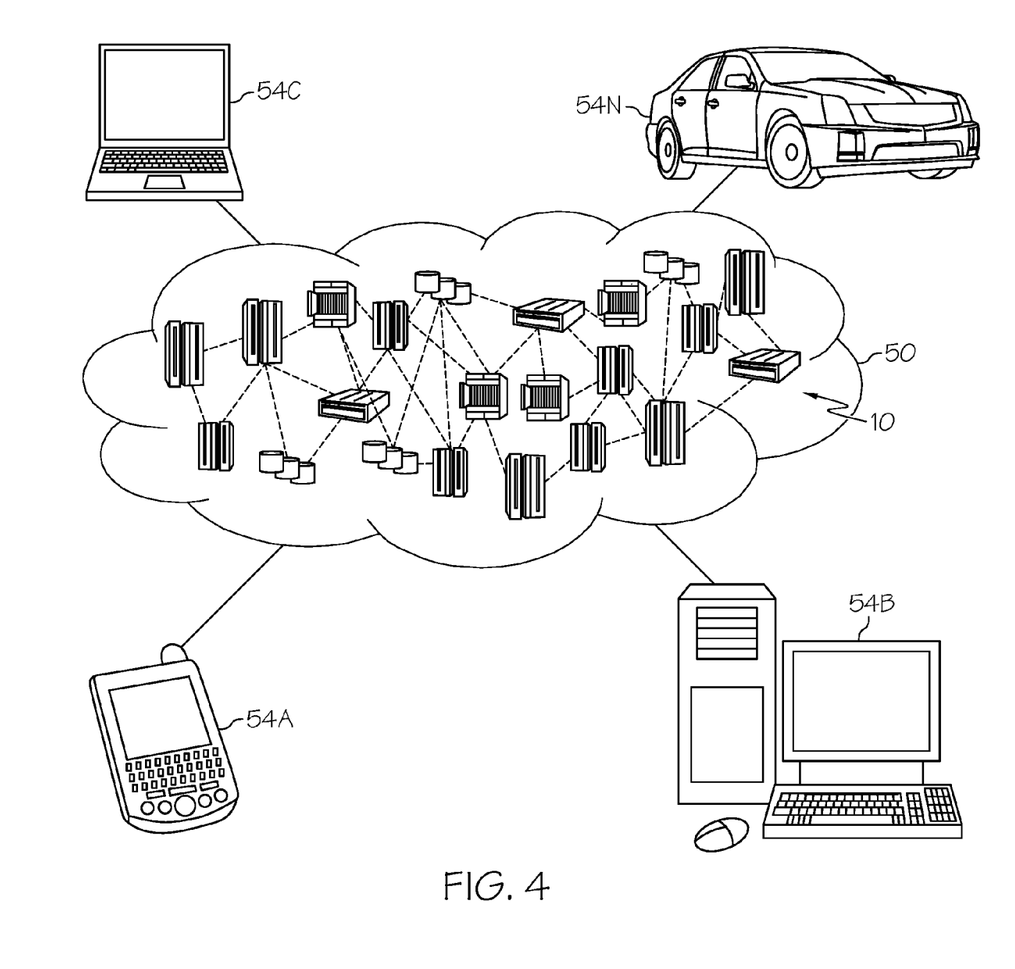
FIG. 4 depicts a cloud computing environment according to an embodiment of the present disclosure.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
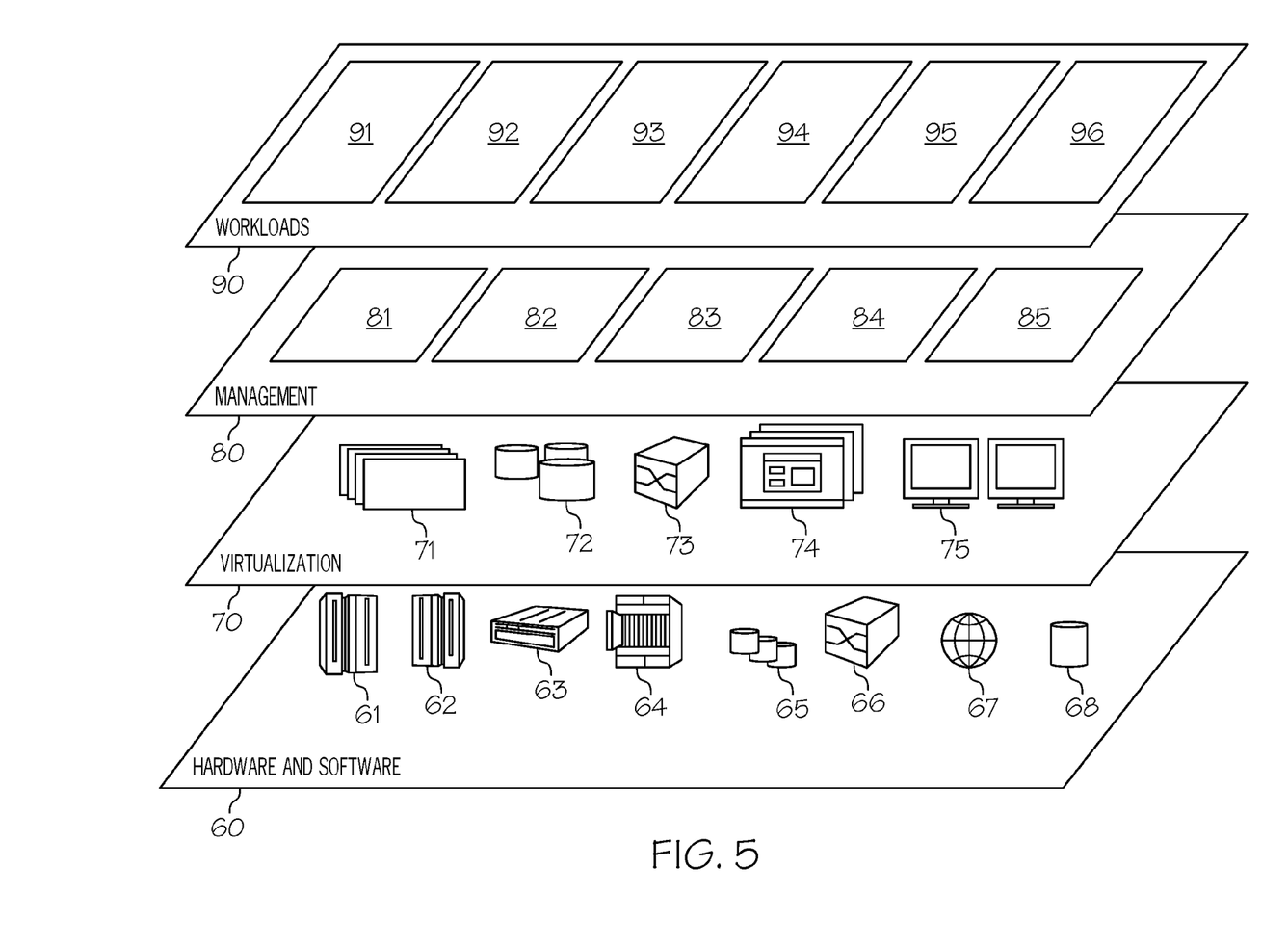
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and electronic system optimization processing 96 (for optimizing operations of an electronic system as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of optimizing operations of an electronic system, the processor-implemented method comprising:
   receiving, by an electronic system, first operational inputs from a first user device;
   receiving, by the electronic system, second operational inputs from a second user device;
   comparing, by one or more processors, an operational input quality of the first operational inputs to an operational input quality of the second operational inputs, wherein an operational input quality of a particular operational input is defined by how efficiently an electronic system functions in response to the particular operational input being utilized by the electronic system; and
   in response to determining that the operational input quality of the second operational inputs is equal to or greater than the operational input quality of the first operational inputs, utilizing, by one or more processors, only the second operational inputs from the second user device to control the electronic system.

2. The processor-implemented method of claim 1, wherein control of operation of the electronic system has reverted to the first user device due to a decrease in operational input quality of the second operational inputs, and wherein the processor-implemented method further comprises:
   transmitting, to the second user device, a message describing a deficiency in the second operational inputs from the second user device, wherein the deficiency in the second operational inputs causes the operational input quality of the second operational inputs to be lower than the operational input quality of the first operational inputs.

3. The processor-implemented method of claim 1, further comprising:
   assigning, by one or more processors, a first identifier to a first user of the first user device;
   unblocking, by one or more processors, the second operational inputs and blocking, by one or more processors, the first operational inputs, wherein unblocked second operational inputs control operation of the electronic system, and wherein blocked first operational inputs no longer control operation of the electronic system; and
   in response to unblocking the second operational inputs and blocking the first operational inputs, assigning, by one or more processors, the first identifier to a second user of the second user device.

4. The processor-implemented method of claim 1, further comprising:
   transmitting, to the second user device, a message comparing and contrasting the first operational inputs and the second operational inputs.

5. The processor-implemented method of claim 1, wherein the first user device initially has total control over the electronic system, and wherein the processor-implemented method further comprises:
   receiving, by the electronic system, third operational inputs from the first user device, wherein the third operational inputs control a portion of the operations of the electronic system;
   receiving, by the electronic system, fourth operational inputs from the second user device, wherein the fourth operational inputs control the portion of the operations of the electronic system;
   comparing, by one or more processors, the operational input quality of the third operational inputs to the operational input quality of the fourth operational inputs; and
   in response to determining that the operational input quality of the fourth operational inputs is greater than the operational input quality of the third operational inputs, transferring, by one or more processors, the total control of the electronic system from the first user device to the second user device.

6. The processor-implemented method of claim 1, further comprising:

assigning, by one or more processors, a set of authorization parameters to the first user device, wherein the set of authorization parameters describes which resources of the electronic system are authorized to be accessed by the first user device;

transferring, by one or more processors, total control of the electronic system from the first user device to the second user device; and in response to transferring total control of the electronic system from the first user device to the second user device, assigning, by one or more processors, the set of authorization parameters to the second user device.

7. The processor-implemented method of claim 6, further comprising:

receiving, by one or more processors, a first positioning signal from a first positioning system on the first user device, wherein the first positioning signal identifies a current location of the first user device;

receiving, by one or more processors, a second positioning signal from a second positioning system on the second user device, wherein the second positioning signal identifies a current location of the second user device;

comparing, by one or more processors, the first positioning signal to the second positioning signal, wherein the first positioning signal and the second positioning signal being equal indicates that the first user device and the second user device are in a same geophysical location; and in response to determining that the first positioning signal and the second positioning signal are not equal, delaying, by the electronic system, the transferring of the total control of the electronic system from the first user device to the second user device until the first positioning signal and the second positioning signal are equal.

8. The processor-implemented method of claim 1, wherein the electronic system performs a set of sequential operations, and wherein the processor-implemented method further comprises:

in response to a predetermined operation from the set of sequential operations being reached by the electronic system, transferring, by the electronic system, total control of the electronic system from the first user device to the second user device.

9. The processor-implemented method of claim 1, further comprising:

receiving, by one or more processors, a first sensor reading from a first sensor on the first user device, wherein the first sensor identifies a first physical property of a first environment of the first user device;

receiving, by one or more processors, a second sensor reading from a second sensor on the second user device, wherein the second sensor identifies a second physical property of a second environment of the second user device;

comparing, by one or more processors, the first sensor reading to the second sensor reading, wherein the first sensor reading and the second sensor reading being equal indicates that the first environment of the first user device and the second environment of the second user device are equal; and in response to determining that the first sensor reading and the second sensor reading are not equal, delaying, by the electronic system, a transfer of control of the electronic system from the first user device to the second user device until the first sensor reading and the second sensor reading are equal.

10. The processor-implemented method of claim 9, wherein the first sensor reading is a first biometric reading of a first user of the first user device, and wherein the second sensor reading is a second biometric reading of a second user of the second user device.

11. The processor-implemented method of claim 9, wherein the first sensor reading is a first airborne substance detection of an airborne substance in the first environment of the first user device, and wherein the second sensor reading is a second airborne substance detection of the airborne substance in the second environment of the second user device.

12. The processor-implemented method of claim 9, wherein the first sensor reading is a first temperature reading of the first environment of the first user device, and wherein the second sensor reading is a second temperature reading of the second environment of the second user device.

13. A computer program product for optimizing operations of an electronic system, the computer program product comprising a non-transitory computer readable storage medium having program code embodied therewith, the program code being readable and executable by a processor to perform a method comprising:

receiving first operational inputs from a first user device;

receiving second operational inputs from a second user device;

comparing an operational input quality of the first operational inputs to an operational input quality of the second operational inputs, wherein an operational input quality of a particular operational input is defined by how efficiently an electronic system functions in response to the particular operational input being utilized by the electronic system; and in response to determining that the operational input quality of the second operational inputs is equal to or greater than the operational input quality of the first operational inputs, utilizing only the second operational inputs from the second user device to control the electronic system.

14. The computer program product of claim 13, wherein the method further comprises:

assigning a set of authorization parameters to the first user device, wherein the set of authorization parameters describe which resources of the electronic system are authorized to be accessed by the first user device;

receiving third operational inputs from the first user device, wherein the third operational inputs control a portion of the operations of the electronic system;

receiving fourth operational inputs from the second user device, wherein the fourth operational inputs control the portion of the operations of the electronic system;

comparing the operational input quality of the third operational inputs to the operational input quality of the fourth operational inputs;

in response to determining that the operational input quality of the fourth operational inputs is equal to or greater than the operational input quality of the third operational inputs, transferring total control of the electronic system from the first user device to the second user device; and in response to transferring total control of the electronic system from the first user device to the second user device, assigning the set of authorization parameters to the second user device.

15. The computer program product of claim 13, wherein the first user device initially has total control over the electronic system, and wherein the method further comprises:
- receiving third operational inputs from the first user device, wherein the third operational inputs control a portion of the operations of the electronic system;
- receiving fourth operational inputs from the second user device, wherein the fourth operational inputs control the portion of the operations of the electronic system;
- comparing the operational input quality of the third operational inputs to the operational input quality of the fourth operational inputs; and
- in response to determining that the operational input quality of the fourth operational inputs is less than the operational input quality of the third operational inputs, delaying a transfer of the total control of the electronic system from the first user device to the second user device until the operational input quality of the fourth operational inputs is greater than the operational input quality of the third operational inputs.

16. The computer program product of claim 13, wherein the first user device initially has total control over the electronic system, and wherein the method further comprises:
- receiving a first positioning signal from a first positioning system on the first user device, wherein the first positioning signal identifies a current location of the first user device;
- receiving a second positioning signal from a second positioning system on the second user device, wherein the second positioning signal identifies a current location of the second user device;
- comparing the first positioning signal to the second positioning signal, wherein the first positioning signal and the second positioning signal being equal indicates that the first user device and the second user device are in a same geophysical location; and
- in response to determining that the first positioning signal and the second positioning signal are not equal, delaying a transfer of control of the electronic system from the first user device to the second user device until the first positioning signal and the second positioning signal are equal.

17. A computer system comprising:
- a central processing unit (CPU), a computer readable memory, and a non-transitory computer readable storage media;
- first program instructions to receive first operational inputs from a first user device;
- second program instructions to receive second operational inputs from a second user device;
- third program instructions to compare an operational input quality of the first operational inputs to an operational input quality of the second operational inputs, wherein an operational input quality of a particular operational input is defined by how efficiently an electronic system functions in response to the particular operational input being utilized by the electronic system; and
- fourth program instructions to, in response to determining that the operational input quality of the second operational inputs is equal to or greater than the operational input quality of the first operational inputs, utilizing only the second operational inputs from the second user device to control the electronic system; and wherein the first, second, third, and fourth program instructions are stored on the computer readable storage media for execution by the CPU via the non-transitory computer readable memory.

18. The computer system of claim 17, further comprising:
- fifth program instructions to assign a set of authorization parameters to the first user device, wherein the set of authorization parameters describe which resources of the electronic system are authorized to be accessed by the first user device;
- sixth program instructions to receive third operational inputs from the first user device, wherein the third operational inputs control a portion of the operations of the electronic system;
- seventh program instructions to receive fourth operational inputs from the second user device, wherein the fourth operational inputs control the portion of the operations of the electronic system;
- eighth program instructions to compare the operational input quality of the third operational inputs to the operational input quality of the fourth operational inputs;
- ninth program instructions to, in response to determining that the operational input quality of the fourth operational inputs is equal to or greater than the operational input quality of the third operational inputs, transfer total control of the electronic system from the first user device to the second user device; and
- tenth program instructions to, in response to transferring total control of the electronic system from the first user device to the second user device, assign the set of authorization parameters to the second user device; and wherein the fifth, sixth, seventh, eighth, ninth, and tenth program instructions are stored on the computer readable storage media for execution by the CPU via the non-transitory computer readable memory.

19. The computer system of claim 17, wherein the first user device initially has total control over the electronic system, and wherein the computer system further comprises:
- fifth program instructions to receive third operational inputs from the first user device, wherein the third operational inputs control a portion of the operations of the electronic system;
- sixth program instructions to receive fourth operational inputs from the second user device, wherein the fourth operational inputs control the portion of the operations of the electronic system;
- seventh program instructions to compare the operational input quality of the third operational inputs to the operational input quality of the fourth operational inputs; and
- eighth program instructions to, in response to determining that the operational input quality of the fourth operational inputs is less than the operational input quality of the third operational inputs, delay a transfer of total control of the electronic system from the first user device to the second user device until the operational input quality of the fourth operational inputs is greater than the operational input quality of the third operational inputs; and wherein the fifth, sixth, seventh, and eighth program instructions are stored on the computer readable storage media for execution by the CPU via the non-transitory computer readable memory.

20. The computer system of claim 17, wherein the first user device initially has total control over the electronic system, and wherein the computer system further comprises:
- fifth program instructions to receive a first positioning signal from a first positioning system on the first user device, wherein the first positioning signal identifies a current location of the first user device;
- sixth program instructions to receive a second positioning signal from a second positioning system on the second user device, wherein the second positioning signal identifies a current location of the second user device;
- seventh program instructions to compare the first positioning signal to the second positioning signal, wherein the first positioning signal and the second positioning signal being equal indicates that the first user device and the second user device are in a same geophysical location; and
- eighth program instructions to, in response to determining that the first positioning signal and the second positioning signal are not equal, delay a transfer of control of the electronic system from the first user device to the second user device until the first positioning signal and the second positioning signal are equal; and wherein the fifth, sixth, seventh, and eighth program instructions are stored on the computer readable storage media for execution by the CPU via the non-transitory computer readable memory.

\* \* \* \* \*